United States Patent
Hu et al.

(10) Patent No.: US 11,335,294 B2
(45) Date of Patent: May 17, 2022

(54) METHOD FOR MANUFACTURING DISPLAY PANEL, DISPLAY PANEL, AND DISPLAY DEVICE

(71) Applicant: HKC CORPORATION LIMITED, Shenzhen (CN)

(72) Inventors: Yunchuan Hu, Chongqing (CN); Feilin Ji, Chongqing (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/042,189

(22) PCT Filed: Dec. 12, 2018

(86) PCT No.: PCT/CN2018/120480
§ 371 (c)(1),
(2) Date: Sep. 28, 2020

(87) PCT Pub. No.: WO2020/087670
PCT Pub. Date: May 7, 2020

(65) Prior Publication Data
US 2021/0118396 A1  Apr. 22, 2021

(30) Foreign Application Priority Data
Oct. 31, 2018 (CN) .......................... 201811286469.0

(51) Int. Cl.
*G09G 3/36* (2006.01)
*G02F 1/1362* (2006.01)

(52) U.S. Cl.
CPC ..... *G09G 3/3688* (2013.01); *G02F 1/136295* (2021.01); *G09G 3/3614* (2013.01);
(Continued)

(58) Field of Classification Search
CPC ........ G02F 1/136295; G02F 1/136286; G09G 3/3614; G09G 2370/00
See application file for complete search history.

(56) References Cited

U.S. PATENT DOCUMENTS 7,808,493 B2 * 10/2010 Hashimoto .......... G09G 3/3688
345/204
2003/0197826 A1   10/2003 Yun et al.
(Continued)

FOREIGN PATENT DOCUMENTS

CN        101114414 A     1/2008
CN        103558720 A     2/2014
(Continued)

OTHER PUBLICATIONS

Jiwu Xing, the ISA written comments, Jul. 2019, CN.
Jiwu Xing, the International Search Report, Jul. 2019, CN.

*Primary Examiner* — William Boddie
*Assistant Examiner* — Bipin Gyawali

(57) ABSTRACT

This application discloses a method for manufacturing a display panel, a display panel, and a display device. The method includes steps of: forming a first substrate; forming a plurality of data lines in the first substrate; and arranging data drive chips, and connecting data signal paths on the data drive chips to the data lines in a one-to-one correspondence, where in a correspondence connection process, data signal paths matching the data lines are selected, the matching data signal paths are connected to the data lines, and suspension processing is performed on mismatching data signal paths.

14 Claims, 8 Drawing Sheets

(52) U.S. Cl.
CPC . *G09G 2310/08* (2013.01); *G09G 2320/0233* (2013.01); *G09G 2370/14* (2013.01)

(56) References Cited

U.S. PATENT DOCUMENTS

| | | | | |
|---|---|---|---|---|
| 2005/0088391 | A1* | 4/2005 | Kim | G09G 3/3677 |
| | | | | 345/94 |
| 2008/0136804 | A1 | 6/2008 | Lee | |
| 2009/0040243 | A1* | 2/2009 | Hisada | G09G 3/3648 |
| | | | | 345/690 |
| 2011/0080434 | A1* | 4/2011 | Tagawa | G09G 3/3266 |
| | | | | 345/690 |
| 2012/0194573 | A1* | 8/2012 | Yamashita | G02F 1/134309 |
| | | | | 345/690 |
| 2012/0299884 | A1* | 11/2012 | Liu | G09G 3/3614 |
| | | | | 345/204 |
| 2015/0364104 | A1* | 12/2015 | Hwang | G09G 3/3688 |
| | | | | 345/690 |
| 2017/0103725 | A1* | 4/2017 | Seki | G09G 3/3696 |
| 2019/0266931 | A1* | 8/2019 | Wang | G09G 3/3225 |

FOREIGN PATENT DOCUMENTS

| | | |
|---|---|---|
| CN | 103592800 A | 2/2014 |
| CN | 105609066 A | 5/2016 |
| CN | 108364597 A | 8/2018 |

\* cited by examiner

| Data drive chip | | | | | | | | | | | | | | | Sn | | | | | | | | | | | | | | | | | | Sn+1 | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|
| Data line | D960 | D959 | D958 | D957 | D956 | D955 | D954 | D953 | ... | D4 | D3 | D2 | D1 | D966 | D965 | D964 | D961 | D960 | ... | D4 | D3 | D2 | D1 |
| Data signal path | D960 | D959 | D958 | D957 | D956 | D955 | D954 | D953 | ... | D4 | D2 | B2 | D1 | D966 | D965 | D964 | D961 | D960 | ... | D7 | D6 | D5 | D4 | D3 | D2 | D1 |
| Horizontal polarity | + | − | − | + | + | − | − | + | ... | + | − | − | + | − | + | + | − | ... | − | − | + | + | − | − | + |

FIG. 6

METHOD FOR MANUFACTURING DISPLAY PANEL, DISPLAY PANEL, AND DISPLAY DEVICE

CROSS REFERENCE OF RELATED APPLICATIONS

This application claims the priority to the Chinese Patent Application No. CN201811286469.0, filed with National Intellectual Property Administration, PRC on Oct. 31, 2018 and entitled "METHOD FOR MANUFACTURING DISPLAY PANEL, DISPLAY PANEL, AND DISPLAY DEVICE", which is incorporated herein by reference in its entirety.

TECHNICAL FIELD

This application relates to the field of display technologies, and in particular, to a method for manufacturing a display panel, a display panel, and a display device.

BACKGROUND

The description herein provides only background related to this application, but does not necessarily constitute the conventional art. With development and advancement of science and technologies, due to hot spots such as thinness, power saving, and low radiation, liquid crystal displays become mainstream products of displays and are widely applied. Most liquid crystal displays on the market are backlight liquid crystal displays, including a liquid crystal panel and a backlight source. The working principle of the liquid crystal panel is: Liquid crystal molecules are placed between two parallel glass substrates, and a drive voltage is applied across the two glass substrates to control rotating directions of the liquid crystal molecules, so that light in the backlight source is refracted out to generate an image. A Thin Film Transistor-Liquid Crystal Display (TFT-LCD) has performance such as low power consumption, good picture quality, and a relatively high production yield and therefore has currently gradually been dominant in the field of display.

A liquid crystal display device has a gate drive chip, a data drive chip, a signal control portion, a color filter, backlight, a power source, and the like. The gate drive chip provides a scanning signal for a scanning line. A data driver chip provides a data signal for a data line, to control pixels in a pixel area to normally work, so that a display area of a display panel presents a picture. Currently, when the display panel works, a bright stripe or a dark stripe occurs on a display picture, which severely affects a display effect of the display panel, and causes reduction of a yield of the display panel.

SUMMARY

This application provides a method for manufacturing a display panel, a display panel, and a display device, to prevent a stripe phenomenon from occurring on the display panel, and ensure a normal display effect.

To achieve the foregoing objective, this application provides a method for manufacturing a display panel. The method includes steps of:
 forming a first substrate;
 forming a plurality of data lines in the first substrate; and
 arranging data drive chips, and connecting data signal paths on the data drive chips to the data lines in a one-to-one correspondence, where in a correspondence connection process, data signal paths matching the data lines are selected, the matching data signal paths are connected to the data lines, and suspension processing is performed on mismatching data signal paths.

To achieve the foregoing objective, this application further provides a display panel that is manufactured by using the foregoing manufacturing method. The display panel includes: a first substrate and a drive circuit coupled to the first substrate. The first substrate includes pixels and a plurality of data lines that is provided to be respectively connected to the pixels. The drive circuit includes a plurality of data drive chips that is provided. Each group of the data drive chips includes a plurality of data signal paths.

Each of the data lines corresponds to one of the data signal paths, a total quantity of the data signal paths is greater than a total quantity of the data lines, and the data signal paths includes at least one data signal path that mismatches the data line and on which suspension processing is performed.

To achieve the foregoing objective, this application further provides a display device, including the foregoing display panel.

When the display panel is manufactured, it needs to be considered whether data signals received by the data lines on the first substrate are data signals required by the data lines. Data signals are transmitted through data signal paths. When data signal paths connected to the data lines mismatch the data lines, for example, polarities are mismatched, charging rates of pixels connected to the data lines are different from a requirement. Consequently, a bright stripe or a dark stripe or other abnormal display occurs at locations, corresponding to the data lines, on the display panel, and a display effect is affected. Therefore, when data signal paths on the data drive chips are connected to the data lines in a one-to-one correspondence, suspension processing needs to be performed on mismatching data signal paths, and data signal paths matching the data lines are selected to connect to the data lines, so that data signals received by the data lines through the matching data signal paths are data signals required by the data lines, further the display effect of the manufactured display panel is normal, and a yield of the display panel is improved.

BRIEF DESCRIPTION OF DRAWINGS

The drawings included are used for providing understanding of embodiments of this application, constitute part of the specification, and are used for illustrating implementations of this application, and interpreting principles of this application together with text description Apparently, the accompanying drawings in the following description show merely some embodiments of this application, and a person of ordinary skill in the art may still derive other drawings from these accompanying drawings without creative efforts. In the figures:

FIG. 6 is a schematic diagram of suspension processing according to an embodiment of this application.

DETAILED DESCRIPTION OF EMBODIMENTS

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top". "bottom" "inside", and "outside" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation, Therefore, such terms should not be construed as limiting of this application. In addition, the terms such as "first" and "second" are used only for the purpose of description, and should not be understood as indicating or implying the relative importance or implicitly specifying the quantity of the indicated technical features. Therefore, a feature defined by "first" or "second" can explicitly or implicitly includes one or more features. In the description of this application, unless otherwise stated, "a plurality of" means two or more. In addition, the terms "include", "comprise" and any variant thereof are intended to cover non-exclusive inclusion.

In the description of this application, unless explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in this application according to specific situations.

The terms used herein are for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, and/or operations, but do not preclude the presence or addition of one or more other features, integers, steps, operations, and/or combinations thereof.

This application is described below with reference to the accompanying drawings and embodiments.

Figure 1:
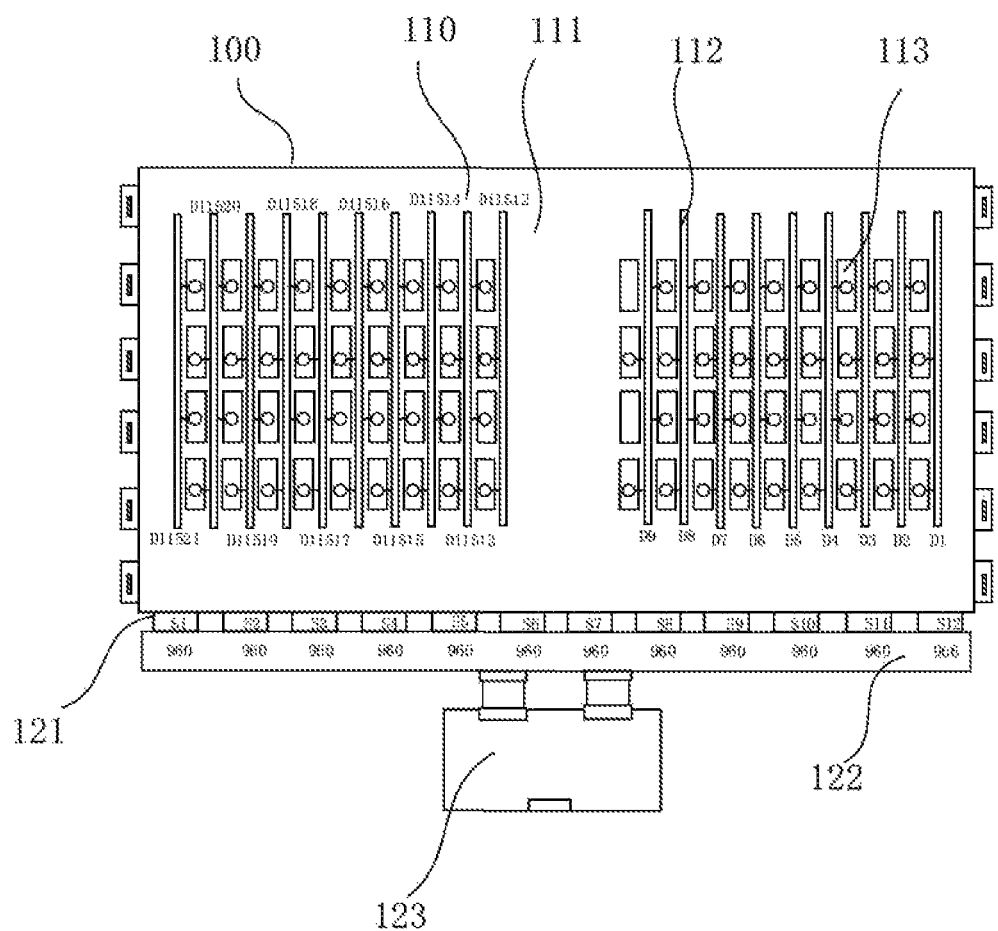
FIG. 1 is a schematic diagram of a display device according to an embodiment of this application.
Figure 3:
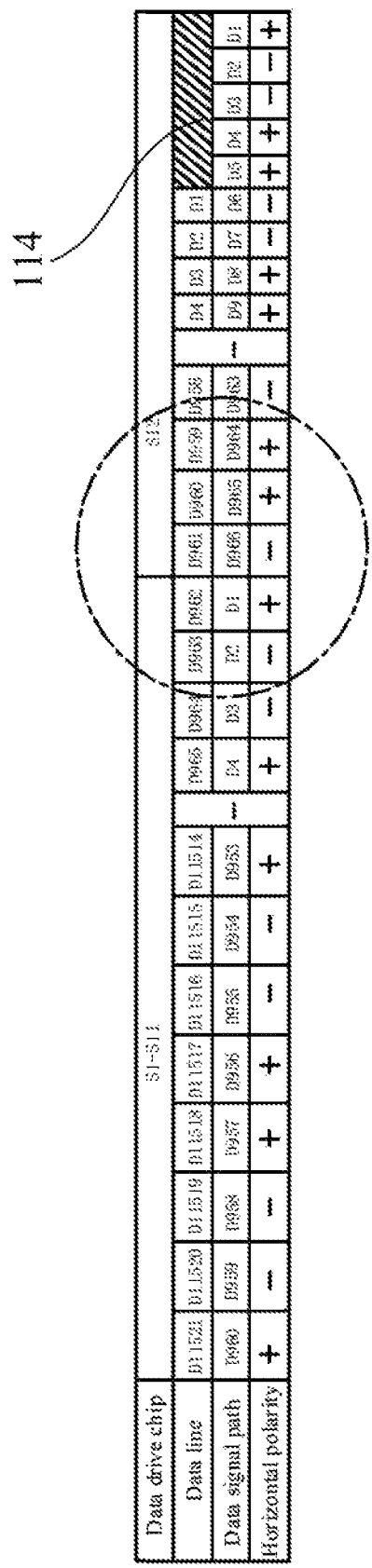
FIG. 3 is a schematic diagram of suspension processing when horizontal polarities are discontinuous according to an embodiment of this application.
Figure 4:
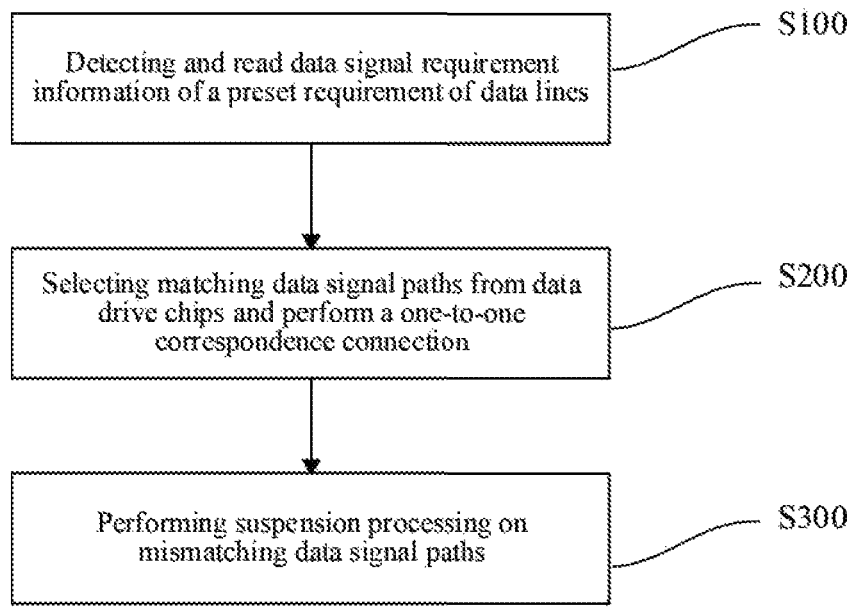
FIG. 4 is a schematic diagram of a method for manufacturing a display panel according to an embodiment of this application.

As shown in FIG. 1 and FIG. 3, an Ultra High Definition (UHD) (3840*2160) display panel 110 currently uses a flip-pixel architecture that includes one more data line than a normal architecture. Corresponding polarities in a horizontal direction are usually distributed in a point reversal manner (+−+−+−+−). To resolve color cast, the polarities in the horizontal direction usually need to continuously reverse in a period of 2 (+−−++−−+). 960 data signal paths are used for data drive chips S1 to S11, and 960 is exactly a multiple of 4. In the data drive chip S11, horizontal polarities of data signals corresponding to the last four data signal paths are +−−+. 966 data signal paths are used for a data drive chip S12, and 966 cannot be divided exactly by 4. Horizontal polarities of a data signal output by the data drive chip S12 at a junction between the data drive chip S12 and the data drive chip S11 are −++−−++−. Therefore, the horizontal polarities are discontinuous at the junction between the data drive chips S11 and S12. Consequently, a display picture of the display panel 110 has stripes at the junction, and a display effect is affected.

Figure 2:
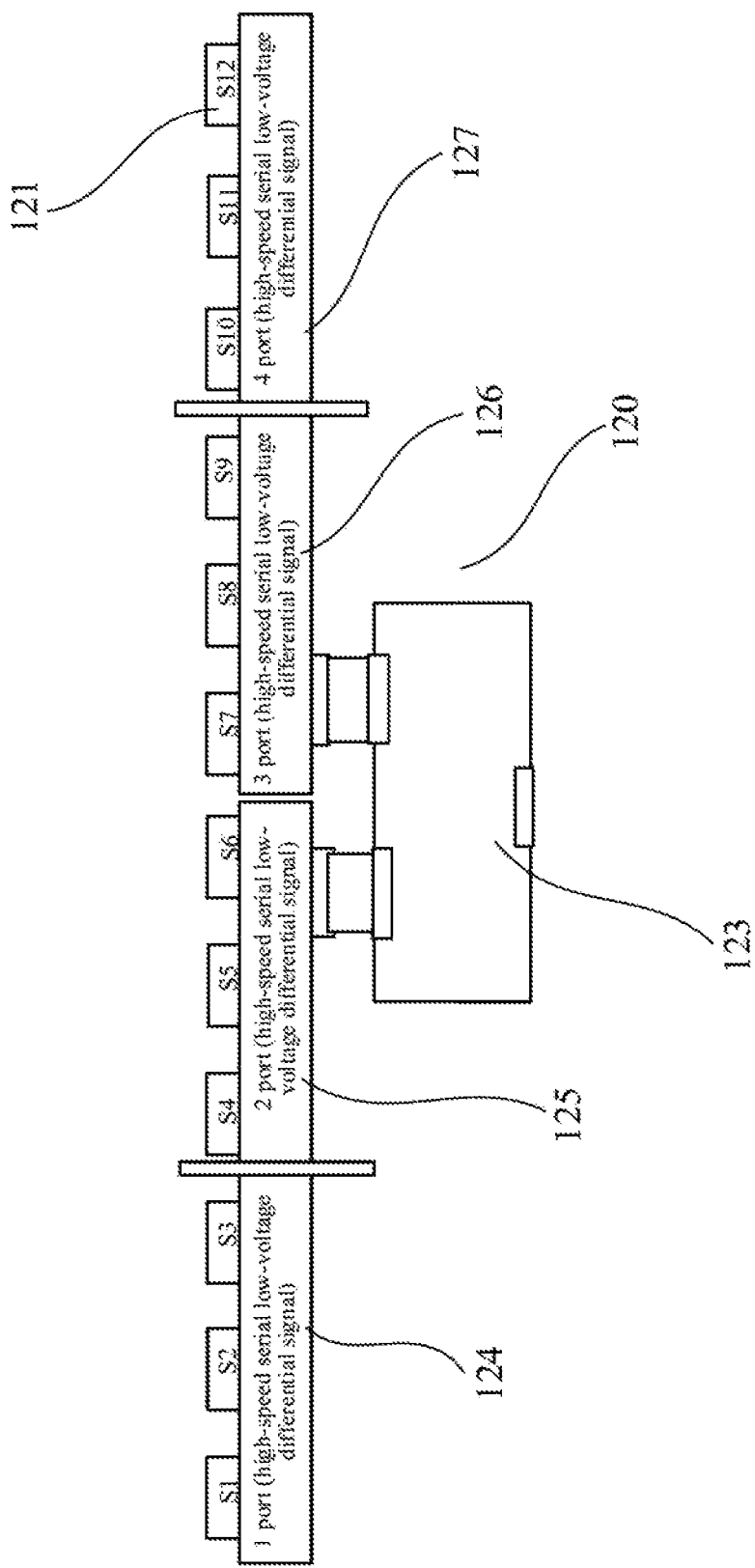
FIG. 2 is a schematic diagram of a drive circuit according to an embodiment of this application.

As shown in FIG. 2, a current practice is connecting the $966^{th}$ data signal path output by the data drive chip S12 to the $961^{st}$ data line in the display panel 110, connecting the $965^{th}$, data signal path to the $960^{th}$ data line in the display panel 110. The rest is deduced by analogy. The sixth output data signal path is connected to the first data line in the display panel 110, and then suspension processing 114 is directly performed on a remaining signal path, namely, the fifth data signal path/the fourth data signal path/the third data signal path/the second data signal path/the first data signal path.

As shown in FIG. 1 to FIG. 4 and FIG. 6, this application discloses a method for manufacturing the display panel 110 in one or more embodiments. The method including steps of:

forming a first substrate 111;

forming a plurality of data lines 112 in the first substrate 111; and arranging data drive chips 121, and connecting data signal paths 122 on the data drive chips 121 to the data lines 112 in a one-to-one correspondence, where in a correspondence connection process, data signal paths 122 matching the data lines 112 are selected, the matching data signal paths 122 are connected to the data lines 112, and suspension 114 processing is performed on mismatching data signal paths 122.

Specifically, the first substrate 111 may be an array substrate, or may be a substrate with a Color Filter on Array (COA). Polarities of data signals transmitted by the data signals paths 122 matching the data lines 112 are the same as those of data signals required by the data lines 112.

When the display panel 110 is manufactured, it needs to be considered whether data signals received by the data lines 112 on the first substrate 111 are data signals required by the data lines 112. Data signals are transmitted through data signal paths 122. When data signal paths 122 connected to the data lines 112 mismatch the data lines 112, for example, polarities are mismatched, charging rates of pixels 113 connected to the data lines 112 are different from a requirement. Consequently, a bright stripe or a dark stripe or other abnormal display occurs at locations, corresponding to the data lines 112, on the display panel 110, and a display effect is affected. Therefore, when data signal paths 122 on the data drive chips 121 are connected to the data lines 112 in a one-to-one correspondence, suspension processing 114 needs to be performed on mismatching data signal paths 122, and data signal paths 122 matching the data lines 112 are selected to connect to the data lines 112, so that data signals received by the data lines 112 through the matching data signal paths 122 are data signals required by the data lines 112, further the display effect of the manufactured display panel 110 is normal, and a yield of the display panel 110 is improved.

In one or more embodiments, a plurality of data drive chips 121 is included, a plurality of groups of data lines 112 is provided, and each data drive chip 121 corresponds to a group of data lines 112; each of the data drive chips 121 includes a group of data signal paths 122; and a quantity of data signal paths 122 on at least one of the data drive chips 121 is greater than a quantity of a corresponding group of data lines 112.

In the correspondence connection process, data signal paths 122 whose quantity is equivalent to a difference between a total quantity of the data signal paths 122 and a quantity of the data lines 112 are selected from all of the data signal paths 122, and suspension processing 114 is performed on the selected data signal paths 122; and matching is performed between remaining data signal paths 122 and the corresponding group of data lines 112.

A plurality of data lines 112 is on the first substrate 111. The data lines 112 are divided into a plurality of groups. The data drive chips 121 correspondingly control a plurality of data signal paths 122. The data signal paths 122 and the data lines 112 are in a one-to-one correspondence. A data drive chip 121 corresponds to a group of data lines 112, The data drive chips 121 are responsible for inputting data signals to the data lines 112 one by one through the data signal paths 122. The design facilitates ordered transmission of the data signals, makes wiring more convenient and ordered when the data drive chips 121 are manufactured, and avoids cross influence between the data signal paths 122. Because a quantity of the data signal paths 122 corresponding to the data drive chips 121 currently has only three fixed specifications, namely, 960, 966, and 1026. To ensure that each group of data lines 112 is connected to a corresponding data signal path 122, a quantity of at least one group of data signal paths 122 is greater than a quantity of a group of data lines 112 corresponding to the at least one group of data signal paths 122. The design can ensure that each of the data lines 112 can receive a required data signal.

In one or more embodiments, the step of that in the correspondence connection process, data signal paths 122 whose quantity is equivalent to a difference between a quantity of the data signal paths 122 and a quantity of the data lines 112 are selected from all of the data signal paths 122, and suspension processing 114 is performed on the selected data signal paths 122; and matching is performed between remaining data signal paths 122 and the corresponding group of data lines 112 includes:

S100: detecting and reading data signal requirement information of a preset requirement of data lines 112;

S200: selecting matching data signal paths 122 from the data drive chips 121 according to the data signal requirement information of the preset requirement, and performing a one-to-one correspondence connection; and S300: performing suspension processing 114 on mismatching data signal paths 122.

Before the suspension processing 114 is performed on the mismatching data signal paths 122, it is necessary to first know data signals required by the data lines 112 to enable the display panel 110 to normally display. Therefore, the data signal requirement information of the preset requirement of the data lines 112 should be first detected and read, the data signal requirement information of the preset requirement is used as a selection standard to select the matching data signal paths 122 from the data drive chips 121, and the one-to-one correspondence connection is performed on the data lines 112 and the matching data signal paths 122. In addition, the suspension processing 114 is performed on mismatching data signal paths 122, so that the pixels 113 corresponding to the data line 112 can all be normally charged, and it is ensured that the display effect of the display panel 110 is normal. The data signal requirement information of the preset requirement may be modified according to a requirement.

Specifically, the data signal requirement information of the preset requirement of the data lines 112 includes polarities in a horizontal direction of a data signal. The polarities in the horizontal direction include a positive polarity and a negative polarity. Therefore, when a polarity of a data signal required by a data line 112 in the horizontal direction is positive, data signal requirement information of a preset requirement of the data line 112 is that the polarity of the corresponding data signal in the horizontal direction is positive. A corresponding data signal path 122 whose polarity is positive in the horizontal direction matches the corresponding data line 112, and the data signal path 122 may be connected to the data line 112. A corresponding data signal path 122 whose polarity is negative in the horizontal direction mismatches the corresponding data line 112, and suspension processing 114 needs to be performed on the mismatching data signal path 122.

In one or more embodiments, the data signal paths 122 are configured to transmit data signals to the data lines 112; and the preset requirement at least includes: polarities of data signals corresponding to the data signal paths 122 in a current data drive chip 121 and a neighboring data drive chip 121 in the horizontal direction present continuous polarity reversal in a period of 2.

Specifically, continuous horizontal polarities represent a signal arrangement manner, to be specific, polarities in the horizontal direction presents continuous polarity reversal in a period of 2. Then, when a data signal path 122 of the current data drive chip 121 that is close to neighboring data drive chip 121 does not satisfy the preset requirement, a horizontal polarity of a corresponding data signal is discontinuous at a location at which the two data drive chips 121 are connected. Discontinuous horizontal polarity causes polarity deviation between the data signal at the location at which the two data drive chips 121 are connected and a data signal around, causes uneven luminance, further causes a bright stripe or a dark stripe to occur at a location at which horizontal polarities are discontinuous at a display picture of the display panel 110, and affects the yield of the display panel 110.

Specifically, when one data drive chip 121 controls 960 data signal paths 122, polarities of 960 data signals corresponding to the 960 data signal paths 122 in the horizontal direction repeat periodically. Polarities corresponding to the first data signal to the fourth data signal in the horizontal direction is +−−+, and polarities corresponding to the fifth data signal to the eighth data signal in the horizontal direction is still +−−+. The rest is deduced by analogy. Polarities corresponding to the $956^{th}$ data signal to the $960^{th}$ data signal in the horizontal direction is still +−−+. Polarities of such data signals in the horizontal direction are continuous. In addition, a reversal occurs for polarities of every two data signals in the horizontal direction. For example, corresponding polarities of the first data signal and the second data signal in the horizontal direction are +−, corresponding polarities of the third data signal and the fourth data signal in the horizontal direction are −+, and a reversal occurs. Polarities of such data signals in the horizontal direction present continuous polarity reversal in a period of 2.

In one or more embodiments, the suspension processing 114 makes the corresponding data signal path 122 still be able to transmit a data signal, but the data signal cannot be transmitted to the data line 112.

Performing the suspension processing 114 does not mean disconnect the corresponding data signal path 122 and not outputting the data signal, but means that the data signal path is not in communication with the data line 112, but a closed circuit is still formed, the data signal path 122 can still transmit data, but the data signal is not transmitted to the data line 112. By using the design, a mismatching data signal is not transmitted to the data line 112, and the data signal path 122 within the data drive chip 121 can also be prevented from disconnecting and affecting normal working of the entire data drive chip 121.

Certainly, the data signal path 122 on which the suspension processing 114 is performed may also not provide a data signal. In this way, no mismatching data signal is transmitted to the data line 112, and a discontinuous polarity of the data line 112 in the horizontal direction is avoided after the data line 112 receives a mismatching data signal.

Figure 5:
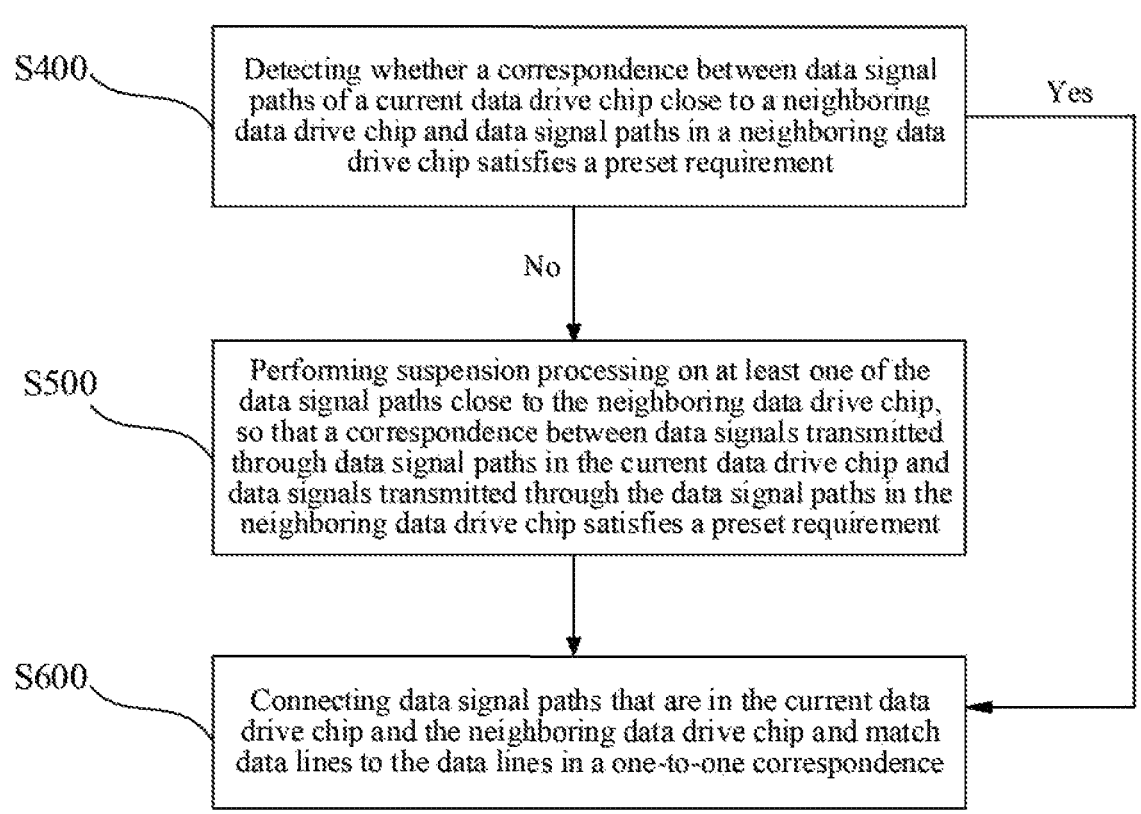
FIG. 5 is a schematic diagram of another method for manufacturing a display panel according to an embodiment of this application.

In one or more embodiments, referring to FIG. 5, different from the foregoing embodiments, the step of that in the correspondence connection process, data signal paths 122 whose quantity is equivalent to a difference between a quantity of the data signal paths 122 and a quantity of the data lines 112 are selected from all of the data signal paths 122, and suspension processing 114 is performed on the selected data signal paths 122; and matching is performed between remaining data signal paths 122 and the corresponding group of data lines 112 includes:

S400: detecting whether a correspondence between data signal paths on a side of a current data drive chip 121 close to a neighboring data drive chip 121 and data signal paths 122 in the neighboring data drive chip 121 satisfies a preset requirement;

S500: if not, performing suspension processing 114 on at least one of the data signal paths 122 close to the neighboring data drive chip 121, so that a correspondence between data signals transmitted by data signal paths 122 in the current data drive chip 121 and data signals transmitted by the data signal paths 122 in the neighboring data drive chip 121 satisfies a preset requirement; and S600: connecting data signal paths 122 that are in the current data drive chip 121 and the neighboring data drive chip 121 and match data lines 112 to the data lines 112 in a one-to-one correspondence.

When the display panel 110 is manufactured, to ensure the yield of the display panel 110, whether data signal paths 122 corresponding to the data lines 112 satisfies the preset requirement need to be detected. Because quantities of data signal paths 122 corresponding to all data drive chip 121 are not all the same, data signals output through data signal paths 122 corresponding to different data drive chips 121 are different, and data signal paths 122 easily mismatch the data lines 112 at a closer location between neighboring data drive chips 121. When it is detected that data signal paths 122 in the current data drive chip 121 close to the neighboring data drive chip 121 do not satisfy the preset requirement (where generally, a polarity of a data signal transmitted through a current data path mismatches a polarity of a data signal transmitted through the neighboring data signal path 122), suspension processing 114 needs to be performed on one or more data signal paths 122 close to the neighboring data drive chip 121, so that data signals transmitted through data signal paths 122, in communication with the data lines 112, in the current data drive chip 121 and the neighboring data drive chip 121 satisfies the preset requirement, data signal paths 122, connected to the data lines 112, in the manufactured display panel 110 can all provide data signals satisfying the preset requirement, and the yield of the display panel 110 is improved.

In one or more embodiments, referring to FIG. 1, FIG. 2, FIG. 6, and FIG. 7, a display panel 110 is disclosed, including: a first substrate 111 and a drive circuit 120 coupled to the first substrate 111. The first substrate 111 includes pixels 113 and a plurality of data lines 112 that is provided to be respectively connected to the pixels 113. The drive circuit 120 includes a plurality of data drive chips 121 that is provided. Each group of the data drive chips 121 includes a plurality of data signal paths 122. Each of the data lines 112 corresponds to a data signal path 122. A total quantity of the data signal paths 122 in the data drive chip 121 is greater than a quantity of the data lines 112. The data signal paths 122 include at least one data signal path 122 that mismatches the data line 112 and on which suspension processing 114 is performed.

The data lines 112 on the first substrate 111 receive data signals transmitted through the data signal paths 122 in the data drive chips 121, thereby charging pixels 113 connected to the data lines 112. When data signal paths 122 connected to the data lines 112 mismatch the data lines 112, charging rates of the corresponding pixels 113 are insufficient, a dark stripe occurs in a display area of the display panel 110 that corresponds to the pixels 113, and affects a yield of the display panel 110 is affected. Therefore, the total quantity of the data signal paths 122 in the data drive chips 121 is greater than the quantity of the data lines 112, and at least one data signal path 122 mismatches the data line 112. Suspension processing 114 is performed on the data signal path 122, and matching data signal paths 122 are connected to the data lines 112, to ensure the yield of the display panel 110.

In one or more embodiments, the data drive chips 121 at least include a first data drive chip 128 and a second data drive chip 129 adjacent to the first data drive chip 128. Horizontal polarities of data signals corresponding to data signal paths 122 of the first data drive chip 128 and the second data drive chip 129 are continuous. Suspension processing 114 is performed on at least one data signal path 122 at an end of the second data drive chip 129 close to the first data chip 128.

Horizontal polarities of data paths closer to each other in two neighboring data drive chips 121 are easily discontinuous, which affects a display effect of the display panel 110. The suspension processing 114 is performed on the at least one data signal path 122 at the end of the second data drive chip 129, of the display panel 110 in this application, close to the first data chip 128, and horizontal polarities of data signals received by data lines 112 corresponding to the first data chip 128 and the second data drive chip 129 after the suspension processing 114 are performed continuous, so that a display effect of the display panel 110 is normal.

In one or more embodiments, referring to FIG. 6, different from the foregoing embodiments, the data drive chips 121 include a first data drive chip 128 and a second data drive chip 129 arranged adjacent to the first data drive chip 128. The first data drive chip 128 includes 960 data signal paths 122, correspondingly connected to 960 data lines 112. The second data drive chip 129 includes 966 data signal paths 122, corresponding to 961 data lines 112. Suspension processing 114 is performed on two data signal paths 122 at an end of the second data drive chip 129 close to the first data drive chip 128 and three data signal paths 122 at the end of the second data drive chip 129 away from the first data drive chip 128.

The first data drive chip 128 includes the 960 data signal paths 122, connected to the corresponding 960 data lines 112 in a one-to-one correspondence. Horizontal polarities of 960 data signals output through the 960 data signal paths 122 are continuous, and four neighboring data signals form a period. Distribution of horizontal polarities of data signals in all periods is the same. However, the second data drive chip 129 includes 966 data signal paths 122, and 966 cannot be divided exactly by 4. In addition, horizontal polarities of data signals output through data signal paths 122 close to the first data drive chip 128 do not satisfy horizontal polarity distribution of data signals in one period. 961 data lines 112 correspond to the second data drive chip 129. The quantity of the data signal paths 122 is greater than that of the data lines 112 by five. The suspension processing 114 is performed on the two data signal paths 122 at the end of the second data drive chip 129 close to the first data drive chip 128 and the three data signal paths 122 at the end of the second data drive chip 129 away from the first data drive chip 128. 961 remaining data signal paths 122 are correspondingly connected to the 961 data lines 112, and matching data signals are transmitted to the data lines 112 through the data signal paths 122, so that horizontal polarities of data signals received by two groups of data lines 112 corresponding to the first data drive chip 128 and the second data drive chip 129 are continuous, and the display effect of the display panel 110 is normal.

Figure 7:
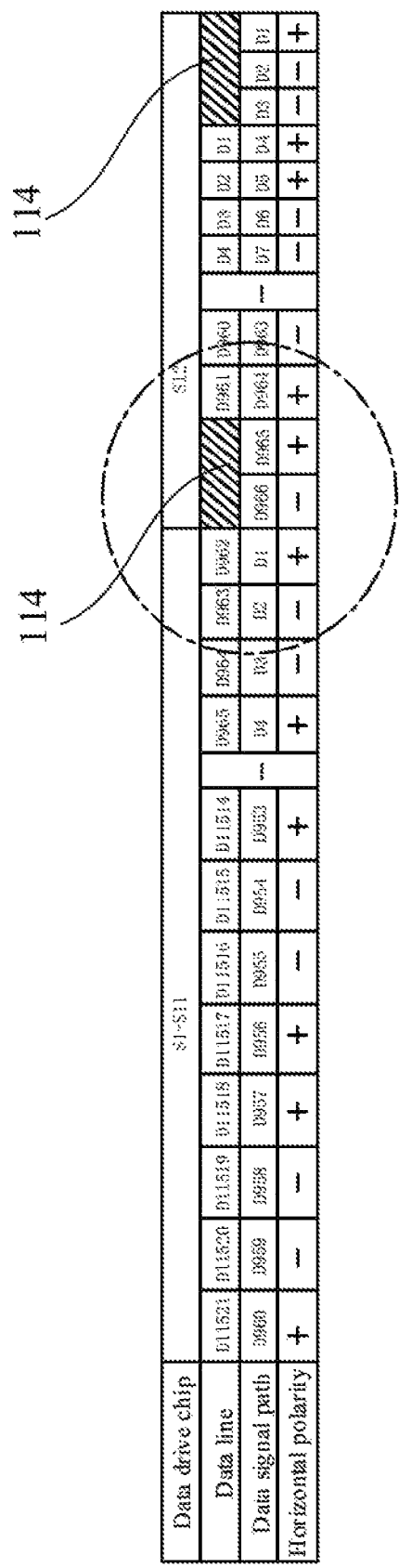
FIG. 7 is a schematic diagram of another suspension processing according to an embodiment of this application.

In one or more embodiments, referring to FIG. 1, FIG. 2 and FIG. 7, a display panel 110 is disclosed, including: a first substrate 111 and a drive circuit 120 coupled to the first substrate 111. The first substrate 111 includes pixels 113 and 11521 data lines 112 that are provided to be correspondingly connected to the pixels 113. The data lines 112 are divided into 12 groups. Each of the first group to the eleventh group includes 960 data lines 112, and the twelfth group includes 961 data lines 112. The drive circuit 120 includes 12 data drive chips 121 that are provided. The 12 data drive chips S1 to S12 and the 12 groups of data lines 112 are in a one-to-one correspondence.

Each of the first to the eleventh data drive chips 121 includes 960 data signal paths 122 connected to 960 data lines 112 in a one-to-one correspondence. The twelfth data drive chip 121 includes 966 data signal paths 122, to connect to 961 data lines 112 of the twelfth data line 112. Each data signal path 122 corresponds to one data signal. Each data line 112 is connected to one data signal path 122, and receives one corresponding data signal. Suspension processing 114 is performed on two data signal paths D966/D965 at one end of the twelfth data drive chip S12 closer to the eleventh data drive chip S11. Suspension processing 114 is performed on three data signal paths D3/D2/D1 at one end of the twelfth data drive chip S12 farther away from the eleventh data drive chip S11.

For the UHD display panel 110, a resolution is 3840× 2160, and a flip-pixel architecture is used. The first substrate 111 of the display panel 110 includes one more data line 112 than other architectures. A total quantity of the data lines 112 is 11521. Two neighboring data lines 112 control a pixel 113 located between the two data lines 112. The 11521 data lines 112 are divided into 12 groups. Each of the first group to the eleventh group includes 960 data lines 112, and the twelfth group includes 961 data lines 112. To make the pixels 113 normally work, a data signal needs to be input into each data line 112. There are correspondingly 12 data drive chips 121, namely, S1 to S12 as shown in FIG. 1. The 12 data drive chips S1 to S12 correspond to 12 groups of data lines 112. A quantity of the data signal paths 122 corresponding to the data drive chips 121 currently has only three specifications, namely, 960, 966, and 1026. Therefore, each of the first to the eleventh data drive chips D1 to D12 includes 960 data signal paths 122 connected to 960 data lines 112 in a one-to-one correspondence. The twelfth group includes 961 data lines 112. Therefore, the twelfth data drive chip 121 needs to include 966 data signal paths 122 to ensure that each corresponding data line 112 can receive a data signal.

Polarities of 960 data signals output through 960 data signal paths 122 in the horizontal direction are continuous. Specifically, polarities of the data signals in the horizontal direction present continuous polarity reversal in a period of 2, and continuous horizontal polarities represent a signal arrangement manner, to be specific, polarities in the horizontal direction presents continuous polarity reversal in a period of 2.

Specifically, when a data drive chip 121 controls 960 data signal paths 122, polarities of 960 data signals corresponding to the 960 data signal paths 122 in the horizontal direction repeat periodically. Polarities corresponding to the first data signal to the fourth data signal in the horizontal direction is +−−+, and polarities corresponding to the fifth data signal to the eighth data signal in the horizontal direction is still +−−+. The rest is deduced by analogy. Polarities corresponding to the $956^{th}$ data signal to the $960^{th}$ data signal in the horizontal direction is still +−−+. Polarities of such data signals in the horizontal direction are continuous. In addition, a reversal occurs for polarities of every two data signals in the horizontal direction. For example, corresponding polarities of the first data signal and the second data signal in the horizontal direction are +−, corresponding polarities of the third data signal and the fourth data signal in the horizontal direction are −+, and a reversal occurs. Polarities of such data signals in the horizontal direction present continuous polarity reversal in a period of 2.

However, the twelfth data drive chip S12 includes 966 data signal paths 122. Horizontal polarities of data signals output through data signal paths 122 close to the eleventh data drive chip S11 do not satisfy signal distribution of continuous polarity reversal in a period of 2. The twelfth group corresponding to the twelfth data drive chip S12 includes 961 data lines 112. The quantity of the data signal paths 122 is greater than that of the data lines 112 by five. The suspension processing 114 is performed on the two data signal paths D966/D965 at the end of the twelfth data drive chip S12 close to the eleventh data drive chip S11 and the three data signal paths D3/D2/D1 at the end of the twelfth data drive chip S12 away from the eleventh data drive chip S11. 961 remaining data signal paths 122 are correspondingly connected to the 961 data lines 112, and matching data signals are transmitted to the data lines 112 through the data signal paths 122, so that horizontal polarities of data signals received by the first group to the twelfth group of data lines 112 are continuous, and the display effect of the display panel 110 is normal.

Specifically, suspension processing 114 is performed on the $966^{th}$ and the $965^{th}$ data signal paths D966/D965 of the twelfth data drive chip S12, and are not connected to the data lines 112. The $964^{th}$ data signal path D964 is connected to the $961^{st}$ data line D961 of the corresponding twelfth group of data lines 112. The $963^{rd}$ data signal path D963 is connected to the $960^{th}$ data line D960 of the corresponding twelfth group of data lines 112. The rest is deduced by analogy. The fourth data signal path D4 is connected to the first data line D1 of the twelfth group of data lines 112. Suspension processing 114 is performed on the third, the second, and the first data signal paths D3/D2/D1.

In one or more embodiments, referring to FIG. 2, the drive circuit 120 includes a timing controller 123. The timing controller 123 respectively transfers data control signals to the first data drive chip 121 to the twelfth data drive chip 121 by using differential signals of four high-speed serial low-voltage differential signal ports. A differential signal of a first high-speed serial low-voltage differential signal port 124 transfers data signals to the first to the $960^{th}$ pixels 113 controlled by the first, the second, and the third data drive chip S1/S2/S3. A differential signal of a second high-speed serial low-voltage differential signal port 125 transfers data signals to the $961^{st}$ to the $1920^{th}$ pixels 113 controlled by the fourth, the fifth, and the sixth data drive chip S4/S5/S6. A differential signal of a third high-speed serial low-voltage differential signal port 126 transfers data signals to the $1921^{st}$ to the $2880^{th}$ pixels 113 controlled by the seventh, the eighth, and the ninth data drive chip S7/S8/S9. A differential signal of a fourth high-speed serial low-voltage differential signal port 127 transfers data signals to the $2881^{st}$ to the $3840^{th}$ pixels 113 controlled by the tenth, the eleventh, and the twelfth data drive chip S10/S11/S12. Specifically, each pixel 113 includes three subpixels.

In one or more embodiments, a total quantity of data signal paths 122 on which suspension processing 114 is performed is not greater than a difference between a total quantity of the data signal paths 122 included in the data drive chips 121 and a total quantity of the data lines.

Figure 8:
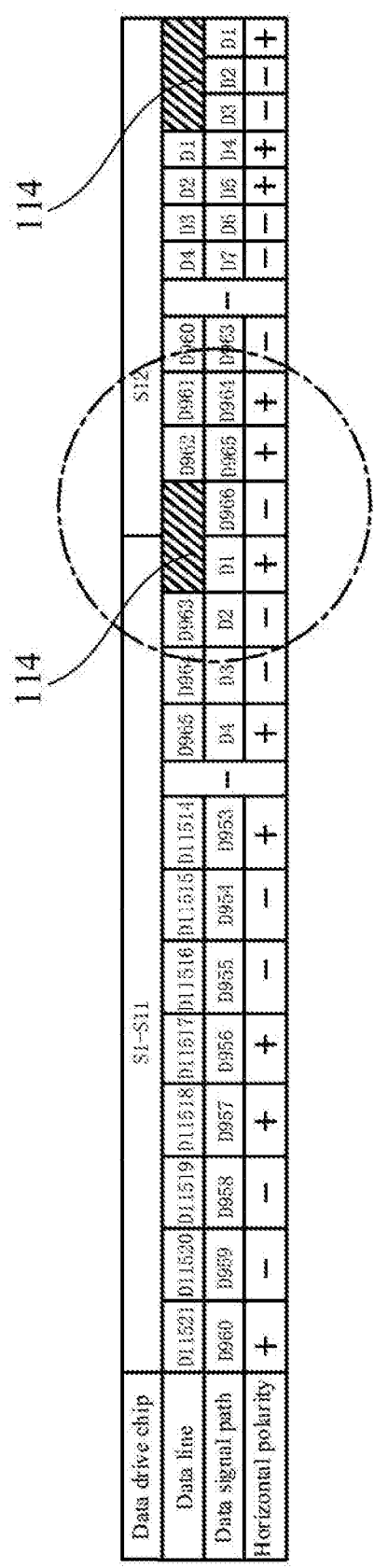
FIG. 8 is a schematic diagram of another suspension processing according to an embodiment of this application.

Referring to FIG. 8, different from the foregoing embodiments, suspension processing 114 is performed on one data signal path D966 at one end of the twelfth data drive chip S12 closer to the eleventh data drive chip S11. Suspension processing 114 is performed on one data signal path D1 at one end of the eleventh data drive chip S11 closer to the twelfth data drive chip S12. Suspension processing 114 is performed on the three data signal paths D3/D2/D1 at one end of the twelfth data drive chip S12 farther away from the eleventh data drive chip S11.

Figure 9:
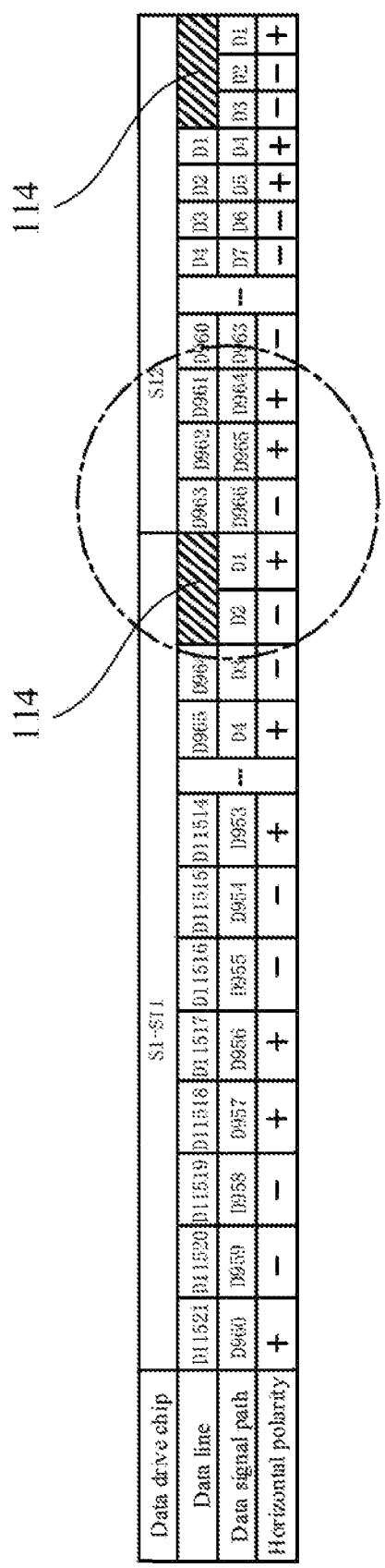
FIG. 9 is a schematic diagram of another suspension processing according to an embodiment of this application.

Referring to FIG. 9, different from the foregoing embodiments, suspension processing 114 is performed on two data signal paths D1 and D2 at one end of the eleventh data drive chip S11 closer to the twelfth data drive chip S12. Suspension processing 114 is performed on three data signal paths D3/D2/D1 at one end of the twelfth data drive chip S12 farther away from to the eleventh data drive chip S11.

In one or more embodiments, referring to FIG. 1, a display device 100 is disclosed, including any one of the foregoing display panels 110.

It should be noted that the sequence numbers of steps involved in a specific solution should not be considered as limiting the order of steps as long as the implementation of this solution is not affected. The steps appearing earlier may be executed earlier than, later than, or at the same time as those appearing later. Such implementations shall all be considered as falling within the protection scope of the present invention as long as this solution can be implemented.

The display panel in this application may be a Twisted Nematic (TN) panel, an In-Plane Switching (IPS) panel, or a multi-domain Vertical Alignment (VA) panel, or may certainly be any other suitable type of panel.

The foregoing content describes this application in detail with reference to the specific optional implementations, and it should not be regarded that the specific implementations of this application are limited to these descriptions. A person of ordinary skill in the art can further make simple deductions or replacements without departing from the concept of this application, and such deductions or replacements should all be considered as falling within the protection scope of this application.

What is claimed is:

1. A method for manufacturing a display panel, comprising steps:
forming a first substrate;
forming a plurality of data lines in the first substrate; and
arranging data drive chips, and connecting data signal paths on the data drive chips to the data lines in a one-to-one correspondence, wherein in a correspondence connection process, data signal paths matching the data lines are selected, the matching data signal paths are connected to the data lines, and suspension processing is performed on mismatching data signal paths;
wherein a plurality of data drive chips is comprised, a plurality of groups of data lines is provided, and each data drive chip corresponds to a group of data lines: each of the data drive chips comprises a group of data signal paths;
a quantity of data signal paths on at least one of the data drive chips is greater than a quantity of a corresponding group of data lines;
in the correspondence connection process, data signal paths whose quantity is equivalent to a difference between a total quantity of the data signal paths and a quantity of the data lines are selected from all of the data signal paths, and suspension processing is performed on the selected data signal paths; and
matching is performed between remaining data signal paths and the corresponding data lines;
wherein the step of selecting, in the correspondence connection process, data signal paths whose quantity is equivalent to a difference between a total quantity of the data signal paths and a quantity of the data lines from all of the data signal paths, and performing suspension processing on the selected data signal paths; and performing matching between remaining data signal paths and the corresponding data lines comprises:
detecting and reading data signal requirement information of a preset requirement of the data lines;
selecting matching data signal paths from the data drive chips according to the data signal requirement information of the preset requirement, and performing a one-to-one correspondence connection; and
performing suspension processing on mismatching data signal paths;
wherein the preset requirement at least comprises:
polarities of data signals corresponding to data signal paths in a current data drive chip and a neighboring data drive chip in a horizontal direction present continuous polarity reversal in a period of 2.

2. The method for manufacturing a display panel according to claim 1, wherein a data signal transmitted through a data signal path matching a data line and a data signal required by the data line have a same polarity.

3. The method for manufacturing a display panel according to claim 1, wherein the data signal requirement information of the preset requirement of the data lines comprises polarities of data signals in a horizontal direction, and the polarities in the horizontal direction are divided into a positive polarity and a negative polarity.

4. The method for manufacturing a display panel according to claim 1, wherein the step of selecting, in the correspondence connection process, data signal paths whose quantity is equivalent to a difference between a total quantity of the data signal paths and a quantity of the data lines from all of the data signal paths, and performing suspension processing on the selected data signal paths; and performing matching between remaining data signal paths and the corresponding data lines comprises:
    detecting whether a correspondence between data signal paths on a side of a current data drive chip close to a neighboring data drive chip and data signal paths in the neighboring data drive chip satisfies a preset requirement;
    if not, performing suspension processing on at least one of the data signal paths close to the neighboring data drive chip, so that a correspondence between data signals transmitted through data signal paths in the current data drive chip and data signals transmitted by the data signal paths in the neighboring data drive chip satisfies a preset requirement; and
    connecting data signal paths that are in the current data drive chip and the neighboring data drive chip and match the data lines to the data lines in a one-to-one correspondence.

5. The method for manufacturing a display panel according to claim 1, wherein the suspension processing enables the corresponding data signal paths to transmit data signals, but the data signals cannot be transmitted to the data lines.

6. A display panel, comprising:
a first substrate; and
a drive circuit, coupled to the first substrate; wherein
the first substrate comprises:
pixels; and
a plurality of data lines that is provided to be respectively connected to the pixels;
the drive circuit comprises;
a plurality of data drive chips that is provided, wherein each group of the data drive chips comprises a plurality of data signal paths; and
each of the data lines corresponds to one of the data signal paths, a total quantity of the data signal paths is greater than a total quantity of the data lines, and the data signal paths comprise at least one data signal path that mismatches the data line and on which suspension processing is performed; and
steps of manufacturing the display panel comprise: forming a first substrate; forming a plurality of data lines in the first substrate; and arranging data drive chips, and connecting data signal paths on the data drive chips to the data lines in a one-to-one correspondence, wherein in a correspondence connection process, data signal paths matching the data lines are selected, the matching data signal paths are connected to the data lines, and suspension processing is performed on mismatching data signal paths;
wherein a plurality of data drive chips is comprised, a plurality of groups of data lines is provided, and each data drive chip corresponds to a group of data lines; and each of the data drive chips comprises a group of data signal paths;
a quantity of data signal paths on at least one of the data drive chips is greater than a quantity of a corresponding group of data lines;
in the correspondence connection process, data signal paths whose quantity is equivalent to a difference between a total quantity of the data signal paths and a quantity of the data lines are selected from all of the data signal paths, and suspension processing is performed on the selected data signal paths; and
matching is performed between remaining data signal paths and the corresponding data lines;
wherein the step of selecting, in the correspondence connection process, data signal paths whose quantity is equivalent to a difference between a total quantity of the data signal paths and a quantity of the data lines from all of the data signal paths, and performing suspension processing on the selected data signal paths; and performing matching between remaining data signal paths and the corresponding data lines comprises:
detecting and reading data signal requirement information of a preset requirement of the data lines;
selecting matching data signal paths from the data drive chips according to the data signal requirement information of the preset requirement, and performing a one-to-one correspondence connection; and
performing suspension processing on mismatching data signal paths;
wherein data signals are transmitted to the data lines through the data signal paths; and
the preset requirement at least comprises:
polarities of data signals corresponding to data signal paths in a current data drive chip and a neighboring data drive chip in a horizontal direction present continuous polarity reversal in a period of 2.

7. The display panel according to claim 6, wherein 11521 data lines are correspondingly connected to pixels 113; and the data lines are divided into 12 groups, each of the first group to the eleventh group comprises 960 data lines, and the twelfth group comprises 961 data lines; and
    the drive circuit comprises 12 data drive chips, and the 8 data drive chips and the 12 groups of data lines are in a one-to-one correspondence.

8. The display panel according to claim 6, wherein the drive circuit comprises a timing controller, and the timing controller respectively transfers data control signals to the first data drive chip to the twelfth data drive chip by using differential signals of four high-speed serial low-voltage differential signal ports.

9. The display panel according to claim 7 wherein the step of selecting, in the correspondence connection process, data signal paths whose quantity is equivalent to a difference between a total quantity of the data signal paths and a quantity of the data lines from all of the data signal paths, and performing suspension processing on the selected data signal paths; and performing matching between remaining data signal paths and the corresponding data lines comprises:
    detecting whether a correspondence between data signal paths on a side of a current data drive chip close to a neighboring data drive chip and data signal paths in the neighboring data drive chip satisfies a preset requirement;
    if not, performing suspension processing on at least one of the data signal paths close to the neighboring data drive chip, so that a correspondence between data signals transmitted through data signal paths in the current data drive chip and data signals transmitted by the data signal paths in the neighboring data drive chip satisfies a preset requirement; and
    connecting data signal paths that are in the current data drive chip and the neighboring data drive chip and match the data lines to the data lines in a one-to-one correspondence.

10. The display panel according to claim 6, wherein the data drive chips at least comprise a first data drive chip and a second data drive chip adjacent to the first data drive chip:
- horizontal polarities of data signals corresponding to data signal paths of the first data drive chip and the second data drive chip are continuous; and
- suspension processing is performed on at least one data signal path at an end of the second data drive chip close to the first data chip.

11. The display panel according to claim 6, wherein the data drive chips comprise:
- a first data drive chip; and
- a second data drive chip, arranged adjacent to the first data drive chip;
- the first data drive chip comprises 960 data signal paths, correspondingly connected to 960 data lines;
- the second data drive chip comprises 966 data signal paths corresponding to 961 data lines; and
- suspension processing is performed on two data signal paths at an end of the second data drive chip close to the first data drive chip and three data signal paths at the end of the second data drive chip away from the first data drive chip.

12. A display device, comprising a display panel, wherein the display panel comprises:
- a first substrate; and
- a drive circuit, coupled to the first substrate;
- the first substrate comprises:
- pixels; and
- a plurality of data lines that is provided to be respectively connected to the pixels;
- the drive circuit comprises:
- a plurality of data drive chips that is provided, wherein each group of the data drive chip comprises a plurality of data signal paths; and
- each of the data lilies corresponds to one of the data signal paths, a total quantity of the data signal paths is greater than a total quantity of the data lines, and the data signal paths comprise at least one data signal path that mismatches the data line and on which suspension processing is performed; and
- steps of manufacturing the display panel comprise: forming a first substrate; forming a plurality of data lines in the first substrate; and arranging data drive chips, and connecting data signal paths on the data drive chips to the data lines in a one-to-one correspondence, wherein in a correspondence connection process, data signal paths matching the data lies are selected, the matching data signal paths are connected to the data lines, and suspension processing is performed on mismatching data signal paths;
- wherein a plurality of data drive chips is comprised, a plurality of groups of data lines is provided, and each data drive chip corresponds to a group of data lines; and
- each of the data drive chips comprises a group of data signal paths;
- a quantity of data signal paths on at least one of the data drive chips is greater than a quantity of a corresponding group of data lines;
- in the correspondence connection process, data signal paths whose quantity is equivalent to a difference between a total quantity of the data signal paths and a quantity of the data lines are selected from all of the data signal paths, and suspension processing is performed on the selected data signal paths; and
- matching is performed between remaining data signal paths and the corresponding data lines;
- wherein the step of selecting in the correspondence connection process, data signal paths whose quantity is equivalent to a difference between a total quantity of the data signal paths and a quantity of the data lines from all of the data signal paths, and performing suspension processing on the selected data signal paths; and performing matching between remaining data signal paths and the corresponding data lines comprises:
- detecting and reading data signal requirement information of a preset requirement of the data lines;
- selecting matching data signal paths from the data drive chips according to the data signal requirement information of the preset requirement, and performing a one-to-one correspondence connection; and
- performing suspension processing on mismatching data signal paths;
- wherein data signals are transmitted to the data lies through the data signal paths; and
- the preset requirement at least comprises:
- polarities of data signals corresponding to data signal paths in a current data drive chip and a neighboring data drive chip in a horizontal direction present continuous polarity reversal in a period of 2.

13. The display device according to claim 12, wherein the data drive chips at least comprise a first data drive chip and a second data drive chip adjacent to the first data drive chip;
- horizontal polarities of data signals corresponding to data signal paths of the first data drive chip and the second data drive chip are continuous; and
- suspension processing is performed on at least one data signal path at an end of the second data drive chip close to the first data chip.

14. The display device according to claim 12,
wherein the data drive chips comprise:
- a first data drive chip; and
- a second data drive chip, arranged adjacent to the first data drive chip;
- the first data drive chip comprises 960 data signal paths, correspondingly connected to 960 data lines;
- the second data drive chip comprises 966 data signal paths corresponding to 961 data lines; and
- suspension processing is performed on two data signal paths at an end of the second data drive chip close to the first data drive chip and three data signal paths the end of the second data chive chip away from the first data drive chip.

* * * * *